US012123072B2

(12) United States Patent
Berry et al.

(10) Patent No.: US 12,123,072 B2
(45) Date of Patent: *Oct. 22, 2024

(54) PROCESSES FOR THE REMOVAL AND RECOVERY OF CADMIUM FROM WET-PROCESS PHOSPHORIC ACID

(71) Applicant: K-Technologies, Inc., Lakeland, FL (US)

(72) Inventors: William W. Berry, Lakeland, FL (US); Thomas E. Baroody, Lakeland, FL (US)

(73) Assignee: K-Technologies, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,213

(22) Filed: Nov. 1, 2023

(65) Prior Publication Data

US 2024/0158888 A1    May 16, 2024

Related U.S. Application Data

(63) Continuation of application No. 17/973,415, filed on Oct. 25, 2022, now Pat. No. 11,840,745, which is a (Continued)

(51) Int. Cl.
*C22B 3/00* (2006.01)
*C01B 25/238* (2006.01)
(Continued)

(52) U.S. Cl.
CPC ............ *C22B 17/04* (2013.01); *C01B 25/238* (2013.01); *C02F 1/42* (2013.01); *C02F 1/52* (2013.01);
(Continued)

(58) Field of Classification Search
None
See application file for complete search history.

(56) References Cited

U.S. PATENT DOCUMENTS 4,861,490 A    8/1989  Morris
11,512,367 B2 *  11/2022  Berry .................... C01B 25/238
(Continued)

FOREIGN PATENT DOCUMENTS

WO    2014018420 A1    1/2014

OTHER PUBLICATIONS

Booker et al., "Removal of cadmium from wet phosphoric acid by ion exchange" Department of Chemical Engineering and Chemical Technology, Imperial College of Science and Technology, South Kensington, London, Feb. 1989.

*Primary Examiner* — Clare M Perrin
(74) *Attorney, Agent, or Firm* — Gregory P. Einhorn; Greer, Burns & Crain, Ltd.

(57) ABSTRACT

In alternative embodiments, provided are methods and processes for the removal of cadmium (Cd) from wet-process phosphoric acid that may contain Cd, including excessive amounts of Cd. The process developed is based on the application of commercially available ion exchange resins with the application of Continuous Ion Exchange (CIX) technology. In alternative embodiments, provided are processes and methods for the recovery and/or the removal of cadmium from wet-process phosphoric acid using a continuous ion exchange approach. In alternative embodiments, use of processes and methods as provided herein allows for the reduction of cadmium metal contaminants with minimal phosphate losses and dilution in order to produce a phosphoric acid that is suitable for the production of fertilizers and phosphoric acid products, such as world-class diammonium phosphate fertilizer (DAP), merchant-grade phos-
(Continued)

phoric acid, super-phosphoric acid, and other phosphoric acid products.

24 Claims, 1 Drawing Sheet

Related U.S. Application Data continuation of application No. 17/616,375, filed as application No. PCT/US2020/035927 on Jun. 3, 2020, now Pat. No. 11,512,367.

(60) Provisional application No. 62/857,142, filed on Jun. 4, 2019.

(51) Int. Cl.
*C02F 1/42* (2023.01)
*C02F 1/52* (2023.01)
*C22B 3/42* (2006.01)
*C02F 1/28* (2023.01)
*C02F 9/00* (2023.01)
*C02F 101/20* (2006.01)

(52) U.S. Cl.
CPC ............... *C22B 3/42* (2013.01); *C02F 1/28* (2013.01); *C02F 9/00* (2013.01); *C02F 2101/20* (2013.01)

(56) References Cited

U.S. PATENT DOCUMENTS

| | | |
|---|---|---|
| 11,840,745 B2 * | 12/2023 | Berry .................... C01B 25/238 |
| 2018/0222809 A1 | 8/2018 | Khouloud et al. |
| 2019/0078176 A1 | 3/2019 | Berry et al. |

* cited by examiner

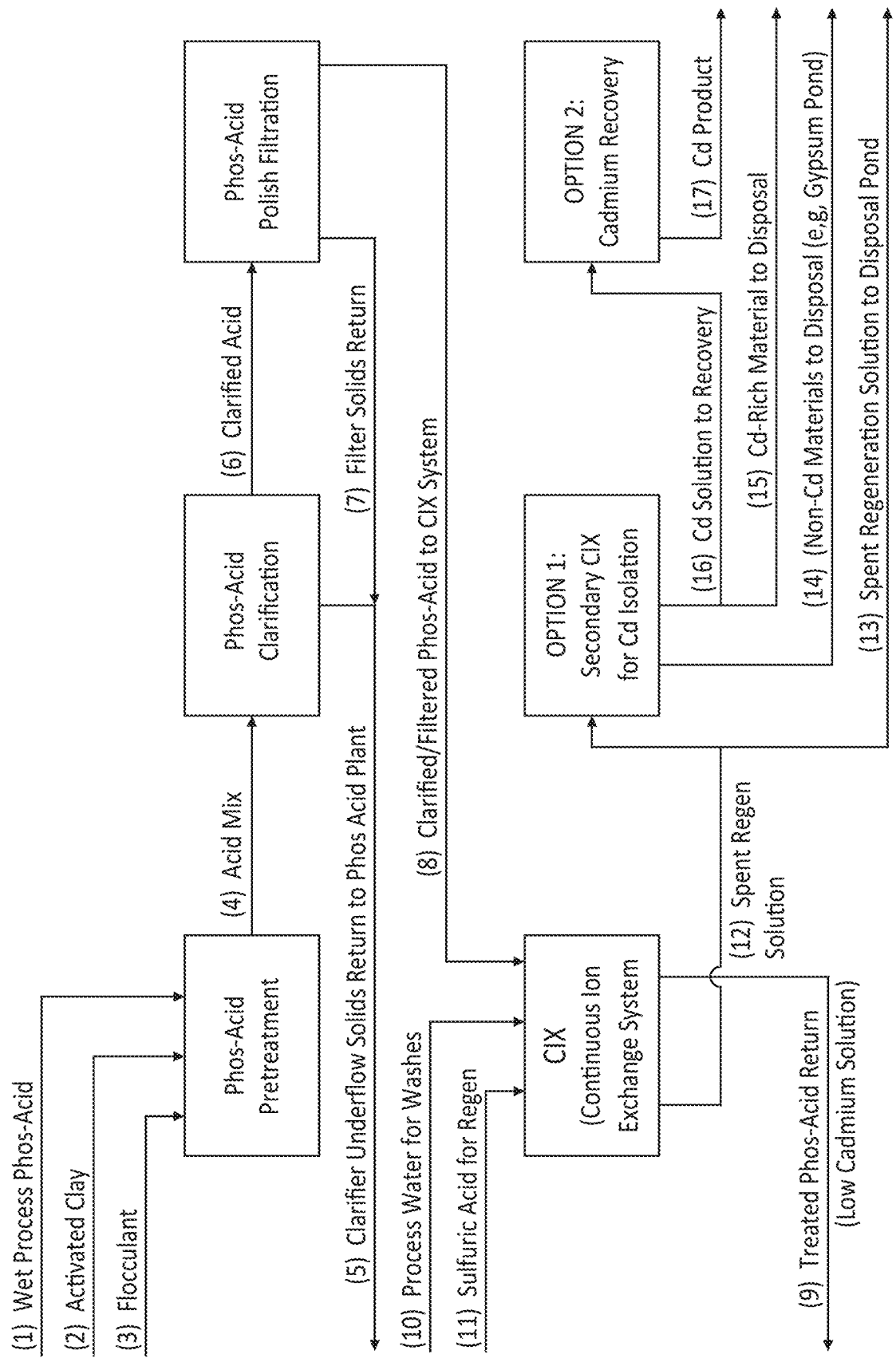

PROCESSES FOR THE REMOVAL AND RECOVERY OF CADMIUM FROM WET-PROCESS PHOSPHORIC ACID

RELATED APPLICATIONS

This application is a continuation of United States National Phase Application U.S. Ser. No. 17/973,415, filed Oct. 25, 2022, now pending, which claims the benefit of continuation of United States National Phase Application U.S. Ser. No. 17/616,375, filed Dec. 3, 2021, now U.S. Pat. No. 11,512,367, issued Nov. 29, 2022, which claims the benefit of priority to Patent Convention Treaty (PCT) International Application PCT/US2020/035927, filed Jun. 3, 2020, now expired, which claims benefit of priority of U.S. Provisional Application Ser. No. 62/857,142 filed Jun. 4, 2019. The aforementioned applications are expressly incorporated herein by reference in their entirety and for all purposes.

TECHNICAL FIELD

This invention generally relates to inorganic chemistry and environmental pollution control. In particular, in alternative embodiments, provided are methods and processes for the removal of cadmium (Cd) from wet-process phosphoric acid that may contain Cd, including excessive amounts of Cd. The process developed is based on the application of commercially available ion exchange resins with the application of Continuous Ion Exchange (CIX) technology. In alternative embodiments, provided are processes and methods for the recovery and/or the removal of cadmium from wet-process phosphoric acid using a continuous ion exchange approach. In alternative embodiments, use of processes and methods as provided herein allows for the reduction of cadmium metal contaminants with minimal phosphate losses and dilution in order to produce a phosphoric acid that is suitable for the production of fertilizers and phosphoric acid products, such as world-class diammonium phosphate fertilizer (DAP), merchant-grade phosphoric acid, super-phosphoric acid, and other phosphoric acid products.

BACKGROUND

Cadmium (Cd) is a naturally occurring very toxic heavy metal. Due to its low permissible exposure in humans, toxic overexposure may occur even in situations where trace quantities of cadmium are found. Ingestion of any significant amount of cadmium causes immediate poisoning and damage to the liver and the kidneys; kidney damage inflicted by cadmium poisoning is irreversible. Some compounds containing cadmium may also be carcinogenic. Acute exposure to cadmium fumes may cause flu-like symptoms including chills, fever, and muscle ache. More severe exposures can cause tracheo-bronchitis, pneumonitis, and pulmonary edema. Symptoms of inflammation may start hours after the exposure and include cough, dryness and irritation of the nose and throat, headache, dizziness, weakness, fever, chills, and chest pain. Inhaling cadmium-laden dust quickly leads to respiratory tract and kidney problems which can be fatal.

In currently used wet-processes for the production of phosphoric acid from various phosphate rock sources, the phosphate ore material (a mixture of complex calcium phosphate and a number of other impurity materials) are reacted with sulfuric acid ($H_2SO_4$) in order to solubilize the phosphate to produce the phosphoric acid solution. Other acids have been used to solubilize the phosphate in the ore, including hydrochloric acid (HCl) and nitric acid ($HNO_3$), which have been used primarily based on local economic conditions. HCl and $HNO_3$ are generally more expensive than $H_2SO_4$ but there are circumstances where local conditions favor the use of these acids.

The majority of the phosphoric acid produced on a world-wide scale generally uses $H_2SO_4$ as the digestion solution to solubilize the phosphate ore. The $H_2SO_4$ and the phosphate ore are combined in a chemical reaction system, referred to as an "attack" or "digestion" system. The phosphate is solubilized to produce phosphoric acid solution and a calcium sulfate (gypsum-$Ca_2SO_4 \cdot 2H_2O$ or $Ca_2SO_4 \cdot 0.5 H_2O$) co-product that is essentially insoluble. The resulting slurry of phosphoric acid solution and insoluble gypsum material is filtered to separate the gypsum from the phos-acid solution.

The gypsum is usually disposed of to waste ponds and the like. The phos-acid solution is usually processed in an evaporation system to produce a more concentrated product for the production of various fertilizers, such as diammonium phosphate (DAP), monoammonium phosphate (MAP), or other nutrient materials. The concentrated acid is also sold into markets as so-called "merchant-grade acid", or MGA. The purchasers generally use this MGA as a feedstock in their own fertilizer production processes.

The phosphate ore usually has a number of impurities that will dissolve, or digest, with the phosphate. Common impurities include aluminum (Al); iron (Fe); magnesium (Mg); fluorides generally as silico fluorides such as fluosilicic acid (H2SiF6); and a range of other minor impurities, such as cadmium, uranium, and the like.

Of potential concern is the amount of cadmium (Cd) that might solubilize with the phosphate component. In the past the Cd was known to be present but there was little done to reduce the amount in the final phosphoric acid products. More attention is now being paid to these Cd levels, particularly in Europe, since through the fertilizer products this material can enter the food chain. To this end there is a need for a straightforward system that can economically, and efficiently, reduce the soluble Cd content in the wet-process acid produced.

A standard strong cation ion exchange resin can be used to extract the bulk of the Cd from a phos-acid solution; however, while the extraction is viable, the amount of acid that can be treated for a given amount of resin is not great, and for conventional ion exchange approaches, such as fixed-bed systems similar to those used in water treatment and the like, this low treatment ratio, i.e. volume of phos-acid treated per volume of ion exchange resin, makes the application of these systems difficult and expensive to operate and control.

SUMMARY

In alternative embodiments, provided are processes and methods for the removal of a cadmium (Cd) impurity or contaminant, from a wet-process phosphoric acid comprising use of a continuous ion exchange (CIX) system, comprising:
(a) providing or having provided:
  a Cd-comprising phosphoric acid solution (1) (see FIG. 1), or a Cd-comprising solution comprising a phosphoric acid, or a Cd-comprising phos-acid feedstock;
  a primary CIX system comprising a strong cationic exchange resin or an equivalent material or composition capable of reversibly binding the Cd, wherein optionally the strong cationic resin is in the H+ form; and a regeneration solution comprising a regeneration acid in a diluted form, wherein optionally the regeneration acid in a diluted form comprises a solution wherein between about 5% to 90%, 10% to 80% or 15% to 70%, or about 20%, 25%, 30%, 35%, 40% or 44%, of the regeneration solution by volume is the regeneration acid;

(b) treating the Cd-comprising phosphoric acid solution, the solution comprising the phosphoric acid or the phos-acid feedstock of (a) with activated clay or equivalents (2) and/or flocculents or equivalents (3) to produce a pretreated acid mix (4) (see FIG. 1);

(c) clarifying or settling the pretreated acid mix (4) in a clarifier or equivalent vessel to remove substantially most of the solids (wherein optionally the removed solids substantially comprise insoluble solids) that are in the pretreated acid mix after the treatment of (b) to produce a clarified phos-acid acid mix (6), wherein optionally between about 50% and 99.9%, or between about 70% and 99%, or between about 80% to 98%, or between about 90% and 97%, of the insoluble solids are removed, wherein optionally a clarifier recyler, or an underflow pump, is used to move or remove the clarifier's underflow, and optionally the moved or removed clarifier's underflow moves or returns the insoluble solids (5) to a phos-acid plant;

(d) treating or filtering the clarified phos-acid acid mix (6) in a polishing filtration system (a so-called "phos-acid polish filtration") to remove any remaining insoluble solids that may be present after the clarifying or settling step of (c), wherein optionally the polishing filtration system comprises use of a pressure leaf filter or equivalents, and optionally after the treating or phos-acid polish filtration step, between about 95% and 99.9%, or between about 98% and 99%, or between about 99% and 100%, of the insoluble solids are removed from the clarified phos-acid solution, and optionally the filtered solids (7) are returned to the phos-acid plant;

(e) feeding or loading the treated or filtered phos-acid solution (8) onto the strong cation exchange resin in the primary CIX system under conditions wherein substantially most of the Cd and non-Cd cations remain on or reversibly bind to the cationic exchange resin, wherein optionally between about 70% and 99.9%, or between about 80% and 99.5%, or between about 90% and 99%, of the Cd remains on or reversibly binds to the cationic exchange resin along with substantially most of the non-Cd cations, and optionally the amount of phos-acid that is fed to the resin is in excess of what would normally be processed with an ion exchange system once the resin is fully loaded so as to cause additional Cd cations to displace or crowd off non-Cd cations bound to the resin, wherein the excess phos-acid is fed to a resin saturated with both Cd and non-Cd cations;

(f) washing the strong cation exchange resin with a solution or solvent (optionally water) that does not remove the Cd or other cations (reversibly) bound to the strong cation exchange resin to remove entrained phos-acid from the strong cation exchange resin prior to eluting the Cd or other ions and regenerating of the resin;

(g) eluting substantially most of or all the Cd and non-Cd cations reversibly bound to the strong cation exchange resin using the regeneration solution (as an eluant), resulting in (or thereby producing) a solution or eluate (or "spent regeneration solution" (12)) comprising all or substantially all of the Cd from the strong cation exchange resin along with all or substantially all of the non-Cd cations that were reversibly bound onto the resin, thereby regenerating the resin, wherein optionally between about 70% and 99.9%, or between about 80% and 99.5%, or between about 90% and 99%, or about 85%, 90%, 95%, 96%, 97%, 98% or 99% or more, of the Cd is eluted from the strong cation exchange resin.

In alternative embodiments the methods or processes as provided herein further comprise moving all or part of the Cd-comprising solution or eluate (or "spent regeneration solution" (12)) from the primary CIX system to:

(i) a pond system (13) for disposal, (ii) a secondary CIX system, where the Cd-comprising solution or eluate (or "spent regeneration solution" (12) (of the first CIX system) is fed or loaded onto a strong cation exchange resin in the secondary CIX system under conditions wherein substantially most of the Cd remains on or reversibly binds to the cationic exchange resin, and all or substantially all of the non-Cd cations do not bind to, or pass through, the resin, wherein optionally between about 80% and 99.9%, or between about 90% and 99%, of the Cd in the spent regeneration solution remains on or reversibly binds to the cationic exchange resin, and after loading the spent regeneration solution (12) of the first CIX system onto the strong cation exchange resin, eluting the Cd and other bound ions with fresh regeneration solution (a dilute form of a strong acid), wherein optionally between about 80% and 99.9%, or between about 90% and 99%, or about 90%, 95%, 96%, 97%, 98% or 99% or more, of the Cd is eluted from the strong cation exchange resin in the secondary CIX system to form a Cd-enriched solution, wherein optionally eluate of the Cd-enriched spent regeneration solution from the secondary CIX system is:

(1) disposed of (15), optionally sent to a separate pond system for disposal; or (2) sent to a cadmium recovery system to recover the Cd as a purified Cd compound or a Cd product (17), wherein optionally the purified Cd is between about 80% and 99.9%, or between about 90% and 99%, or about 90%, 95%, 96%, 97%, 98% or 99% or more Cd pure, and optionally eluate material from the secondary CIX system substantially not comprising Cd is disposed of in a gypsum pond (14) or a separate pond system.

In alternative embodiments of methods or processes as provided herein, the strong cationic exchange resins or equivalent material or composition capable of reversibly binding the Cd comprises:

a PUROLITE SST-60™ material, comprised of gel polystyrene crosslinked with divinylbenzene (DVB) and a sulfonic acid functional group (PUROLITE™, Bala Cynwyd, PA), or equivalents;

a PUROLITE C-100™ resin, comprised of gel polystyrene crosslinked with divinylbenzene (DVB) and a sulfonic acid functional group (Purolite, Bala Cynwyd, PA), or equivalents; or a DOWEX MSC 650™ material (Dow Chemical, Midland, MI), or equivalents wherein optionally the compositions comprise beads, wires, meshes, nanobeads, nanotubes, nanowires or other nano-structures, or hydrogels.

In alternative embodiments of methods or processes as provided herein, the regeneration acid comprises a sulfuric acid ($H_2SO_4$), a nitric acid (HNO3) or a hydrochloric acid (HCl), and optionally the sulfuric, nitric or hydrochloric acid strength is from about 5% to up to about 98%, or the strength in a range of between about 20% to about 40% (wherein optionally the regeneration acid comprises between about 5% to about 98%, or between about 20% to about 40%, of the volume of the regeneration solution);

and optionally the sulfuric acid, nitric acid or hydrochloric acid strength is from between about 5% up to 99%, or the acid strength is about 35%, 40%, 50%, 60%, 70%, 80%, 90% or 98%, or the acid strength can be in a range of about 62% for nitric acid and about 37% for hydrochloric acid.

In alternative embodiments, provided are industrial processes for the removal of cadmium (Cd) from a wet-process phosphoric acid comprising use of a continuous ion exchange (CIX) system in an industrial process as set forth in FIG. 1, or any portion or sub-process thereof.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims.

FIGURES are described and discussed herein.

FIG. 1 schematically illustrates an exemplary process as provided herein, an overall process flow diagram for an exemplary cadmium impurity reduction process as provided herein.

Like reference symbols in the various drawings indicate like elements.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

In alternative embodiments, provided are processes and methods for the recovery or the removal of cadmium (Cd) from a wet-process phosphoric acid stream or phos-acid solution (including e.g., a phos-acid solution generated in a wet-process for the production of phosphoric acid from various phosphate rock sources (the phosphate ore material) using a continuous ion exchange (CIX) approach.

In alternative embodiments, processes and methods as provided herein comprise use of CIX systems. The amount of phos-acid treated relative to the amount of resin that must be regenerated in the CIX system is within a range where the application of the CIX system can be effectively utilized. This approach allows for the removal of the bulk of (e.g., substantially most of) the soluble Cd from the phos-acid in a more efficient fashion, thus reducing the potential associated costs for the Cd reduction process.

The schematic of FIG. 1 illustrates an exemplary process where the wet process phos-acid (1) is first pretreated using activated clay (2) and/or flocculents (3) to produce a pretreated acid mix (4).

This acid mix (4) pretreatment is then followed with a clarification or settling system ("phos-acid clarification") to remove the bulk of (substantially most of the) insoluble solids that are in the acid after the first pretreatment (with activated clay (2) and/or flocculents (3)) to produce a clarified acid mix (6). Via a clarifier underflow the insoluble solids (5) are returned to the phos-acid plant.

This clarification step is followed by treatment of the clarified acid mix (6) in a polishing filtration system (a so-called "phos-acid polish filtration") to remove the traces of solids that may be present after the clarification step. Filtered solids (7) are returned to the phos-acid plant.

The pretreated "clarified and filtered" acid (8) is then fed to or loaded onto a first or primary CIX system, where the "clarified and filtered" acid (8) comes in contact with a strong cationic exchange resin or equivalent material or composition capable of reversibly binding the Cd, which can comprise resins produced by companies such as Lanxess; Purolite; Dow/Rohm and Haas; Resin-Tech, and the like. There is no special treatment needed for the resin for use in this application.

The "clarified and filtered" acid (8) is contacted with or loaded onto the strong cation resin in the first or primary CIX system where the bulk of the Cd in the "clarified and filtered" acid (8) is removed, i.e., the Cd is (and other cations are) loaded onto (or reversibly bind to) the resin. There are a number of other materials that will load onto the resin, thus the amount of acid treated is lower than deemed acceptable for more conventional ion exchange systems such as the fixed bed approaches mentioned earlier.

After the strong cation resin is loaded with (or reversibly binds) the Cd, it is transferred to a washing step (using "process water" (10)) within the first or primary CIX system itself to recover any entrained phos-acid, which is then followed by a resin regeneration step where the strong cation resin is contacted with a solution of weak (for example, about 5 to about 35%) sulfuric acid ($H_2SO_4$) (11). The $H_2SO_4$ regeneration solution removes the Cd and the various ions loaded (or reversibly bound) onto the resin; this results in the production of a "spent regeneration solution" (12) that contains the Cd along with a number of other cations.

An important point that should be noted is that due to the nature of the Cd and its relatively high affinity for the strong cation resin, compared to a number of the other ions that are generally present in much higher quantities than the Cd, for example, iron (Fe), aluminum (Al) and the like, it has been found that the amount of acid fed to the cation resin can be greater than would normally be associated with the full loading of the resin by the multiple cations. Thus, even when the resin is fully loaded with cations, if the acid feed is continued to the resin, then the Cd will begin to displace or "crowd" some of the other loaded cations, such as Fe and Al, thus the amount of Cd that can load onto the resin is greater than would be expected based solely on the resin capacity and the amount of total cations present in the acid being fed to the CIX system. Since the Cd is the cation of interest, use of this "crowding" technique based on the higher affinity of the Cd for the resin compared to a number of the other cations present allows the CIX system to treat more acid than would normally be expected. In other words, in practicing methods as provided herein, an amount of acid can be sent to the CIX ion exchange system which is in excess of what would normally be sent to an IX resin from a stoichiometric cation loading standpoint. By virtue of the higher Cd affinity for the cation resin, compared to some of the other non-Cd cations which are present in much larger concentrations compared to the Cd concentration, this "crowding" step allows removal of more Cd from the acid, which then displaces the non-Cd cations from the resin that have a lower affinity for the resin than the Cd cations. This "crowding" process alters the stoichiometry to enable the resin to capture more Cd cations at the expense of non-Cd cations that would have initially attached to the resin from a normal stoichiometry standpoint. See Example 1, below, which provides data demonstrating this effect.

In alternative embodiments, if the resin could hold a specific amount of cations, say X, then the quantity of acid that would pass through the resin would be limited to the amount of cations that could be removed from the resin totaling X. Once the resin was fully loaded with cations, under normal circumstances the acid flow would be stopped and the resin would be removed from loading service. In the exemplary Cd extraction methods as provided herein, however, the Cd has a much higher affinity for the resin than most of the other cations present in the acid. Thus, by continuing the acid flow to the resin, past the point where it is fully loaded with cations, the Cd from the continuing acid flow will begin to displace some of the non-Cd cations that have loaded onto the resin. In this manner, since the objective is to remove Cd, and not some of the other cations such as Fe, or Al, the phos-acid flow can be continued to the resin to allow for the Cd to displace non-Cd cations by crowding them off. In alternative embodiments, when the Cd loading is complete it may be that the amount of acid treated was 50% to 100% more than the amount of phos-acid that could be treated under the "normal" circumstances, i.e. where the resin is removed from service after it is fully loaded with cations, both Cd and non-Cd In alternative embodiments, the primary CIX system has about 30 columns, or can have between about 2 to 50 columns, or between about 4 to 40 columns, or between about 5 to 35 columns, and optionally each column is between about 2 to 3 meters (m) in diameter, and optionally each column is between about 3 to 3.5 meters (m) in height. In alternative embodiments, a single 30-column CIX unit can process between about 200 to 300 m$^3$/h of phos acid flow rate. This would represent a phos acid treatment of between about 450,000 to 500,000 metric ton (MT)/year (yr) P$_2$O$_5$.

As described in Example 1, below, which provides the results for a specific test, it was seen that at an exemplary treatment rate of about 3 bed volumes (BV) the resin was essentially loaded to its capacity with cations. However, due to the higher affinity of the Cd for the resin compared with the other non-Cd cations, which were present in much greater concentrations relative to the Cd, additional acid was passed through the resin, and it can be observed that the Cd continued to load, for example, BV 4, 5, and 6. In this manner, the amount of acid treated was greater than would first be estimated based on the amount of cations in the acid and the capacity of the cation ion exchange resin.

In alternative embodiments, depending on the particular plant facility (factory) situation, this spent H$_2$SO$_4$ regeneration solution (12) can be disposed of to a pond system (13) or, alternatively, the solution can be further treated (for example, using methods a provided herein) to further isolate the Cd from the other ions present in the spent regeneration solution. This isolation step allows for a reduction in the volume associated with the Cd-containing solution, and if Cd levels are sufficient, allows for the possible recovery of the Cd as a commercial product.

In one embodiment, the isolated Cd solution is further treated for Cd recovery in a secondary CIX system similar to the first or primary CIX system, but smaller in size. In alternative embodiments, this secondary Cd removal facility would process between about 65 to 100 m3/hr of spent regeneration solution flow rate. This volume represents about one-third of the flow rate of phos acid through the primary CIX system, and would require one smaller CIX system. In alternative embodiments, there may be a need for a clarification and polish filtration pre-treatment steps before the spent regeneration solution enters the secondary CIX. In alternative embodiments, overall area requirements are about 40 meters by about 70 meters; this would allow for the various support tanks and other peripheral equipment.

In alternative embodiments: the non-Cd containing solution is disposed of in a gypsum pond (14) or a separate pond system (for example, the non-Cd containing solution is pumped to the plant's waste gypsum stack, and this may represent about 5% to 10% of the flow rate of the gypsum going to the stack); the Cd-rich eluent solution or material is disposed of separately (15); or alternatively, the Cd-rich eluent solution is recovered (16) to produce a marketable Cd product (17).

In the exemplary process illustrated in the schematic of FIG. 1, the phos-acid (1) is fed to the acid pretreatment system. In this step activated clay (2), such as a standard bentonite material, is added to the acid to act as a so-called "body-feed" and assist in the subsequent clarification step. A standard flocculent material (3) is then added to the phos-acid/clay mixture to agglomerate the suspended solids and produce larger solids agglomerates that will more readily settle in the next clarification step.

The pretreated acid mix with the additives is then transferred to the Phos-Acid Clarification system (4). In this step, the acid mix enters the clarification system and the agglomerated solids settle to the bottom of the clarification unit. These solids are collected and returned to the phos-acid plant (5).

Next, the clarified acid (6) is fed to the Phos-Acid Polish Filtration system. In this step the acid is treated in a filtration unit to remove trace amounts of solids that may have carried over into the clarifier overflow with the phos-acid. The solids removed are also returned to the phos-acid plant (7).

The phos-acid from the polish filtration step (8) is then transferred to the first or primary Continuous Ion Exchange, or CIX, system. The CIX is a continuous contacting system wherein multiple functions are carried out simultaneously in a continuous manner.

In the initial resin contacting step with the CIX system, the phos-acid is counter-currently contacted with the strong cation ion exchange resin and the Cd, along with other cations, are loaded onto the resin. As indicated in the schematic of FIG. 1, other materials load onto the resin, but is has been found that the Cd has a relatively higher affinity for the resin when compared to a number of the other cations. This "competition" allows for the Cd to be removed to a larger extent than would be expected with just a straight proportional loading. The CIX-treated phos-acid (9), now depleted of Cd and other cations, is returned to the phos-acid plant and enters the normal processing steps, e.g. concentration and the like.

The loaded resin is then washed with process water (10) to remove phos-acid that may be entrained in the resin and minimize $P_2O_5$ losses. The CIX system allows for the removal of entrained materials from the resin with reduced phos-acid dilution and losses.

After the washing step the resin is contacted with a dilute (for example, between about 5% to about 35% dilute, or about 2% to 50% diluted, or about 1% to 80% diluted, or any amount of dilution from the standpoint of commercial $H_2SO_4$, which is about 96% to 98% $H_2SO_4$) solution of sulfuric acid (11) (for example, between about 5% to about 35% dilute means by volume the solution is between about 5% to about 35% sulfuric acid, with the balance being water). The hydrogen ion (H+) of the $H_2SO_4$ solution displaces the cations that were loaded onto the resin and regenerates the resin so that it can be returned to loading service. The cations are removed from the resin as a mixed sulfate salt solution. After the $H_2SO_4$ regeneration or regenerations, the resin is again water washed and the regenerated resin is moved back to the loading step to treat more untreated phos-acid.

In alternative embodiments, the spent sulfate regeneration solution, loaded with the various cations after regeneration (12), can then be sent to several alternative destinations:

A first possible destination would be to dispose of the spent regeneration solution to a separate waste holding pond system (13). In this case, the other impurities removed in the CIX system would stay with the Cd solution and the total sent to the waste pond.

A second option would be to send the spent regeneration solution to an additional separation step (Option 1). In this step the solution would be treated in a smaller secondary CIX system to separate the Cd material from the bulk of the other cations. In this manner the amount of Cd-bearing solution would be reduced. The non-Cd materials (14) would be sent to the plant's gypsum ponds or other designated disposal point.

In alternative embodiments, the Cd-bearing solution from this Option 1 step (15) could then be disposed of to its own specific holding pond, if desired. Alternatively, depending on the amount of contained Cd in the spent regeneration solution, the Cd-rich solution (16) could be transferred to the Option 2-Cadmium Recovery stage. In this case, the Cd would be recovered as a marketable cadmium compound or product (17), for example a cadmium oxide (CdO), for use in various industrial applications. Again, the choice of the final configuration can be site specific.

The invention will be further described with reference to the examples described herein; however, it is to be understood that the invention is not limited to such examples.

EXAMPLES

Example 1: Exemplary Methods

This example describes an exemplary process of the invention for the removal of a cadmium (Cd) impurity or contaminant from a wet-process phosphoric acid comprising use of a continuous ion exchange (CIX) system.

This example shows the results of an actual test that was conducted, and demonstrates the capacity of methods as provided herein for using a cation resin to remove Cd from a phos-acid, and to illustrate the effect of the higher Cd affinity for the resin, compared with other cations that load on the resin. The work was conducted using a bench-scale batch column in order to demonstrate the breakthrough response of the acid with the resin and the displacement of loaded non-Cd cations with Cd after the resin was loaded to capacity.

Phos-acid, that had been clarified and polish filtered, was fed to a static test column. Samples of effluent (treated phos acid) from the column were taken. The treated effluent from the column was taken in so-called 1 bed volume (BV) increments. From the standpoint of the volume of the BV, if the column contained 100 ml of resin, then 1 BV would equal 100 ml, i.e. a BV is equal to the volume of resin in the column. This measurement technique is commonly used in ion exchange work since it allows for direct comparison of systems that may have different volumes of resin in the columns.

In order to illustrate the system's response, only a limited number of cations were used for the following table. The main point was to show the affinity of Cd for the resin even when the Cd was present in a very small concentration and some of the non-Cd cations where present at much greater concentrations, when compared to the Cd.

TABLE

BREAKTHROUGH RESULTS FOR CD REMOVAL FROM PHOS-ACID (TREATED ACID BED VOLUMES (BV)) OF PHOS-ACID)

| Sample: | Al (ppm) | Fe (ppm) | Mg (ppm) | Cd (ppm) |
|---|---|---|---|---|
| Phos-acid feed (filtered) | 6,957 | 6,849 | 8,207 | 2.3 |
| BV-1 | 1,469 | 4,398 | 0 | 0 |
| BV2 | 5,166 | 6,901 | 1 | 0 |
| BV-3 | 7,163 | 7,486 | 39 | 0 |
| BV-4 | 8,171 | 7,695 | 924 | 0 |
| BV-5 | 7,966 | 7,346 | 4,570 | 1.0 |
| BV-6 | 7,525 | 7,089 | 7,262 | 1.9 |

As can be seen, the phos-acid feed had a very small amount of Cd to start with, i.e. about 2.3 ppm. The non-Cd cations were in excess of 26,000 ppm when considering not only the cations shown but those measured and not shown.

The Cd level in this acid was low to start with, which would not generate any particular concern for this acid from a Cd content standpoint. The main point to note for this acid is that even with the low starting Cd level, the Cd was further removed and reduced in the ion exchange treated acid to a level of essentially zero (0). As is the case in many extraction processes, it is the last bit of target material to be removed which is the most difficult. Thus, the low starting Cd demonstrates the ability of this exemplary system to remove the Cd to very low levels in the presence of large amounts of non-Cd cations.

It should also be noted that the affinity of the Mg for the resin is also higher than the other major non-Cd cations, e.g. Al and Fe. Thus, the Mg is exhibiting much of the same displacement properties as the Cd, but not to as great an extent. However, the important point is that with the utilization of the continuous ion exchange approach of methods as provided herein permits these mechanisms to be employed in an effective manner. This same technique could not be accomplished using fixed bed ion exchange.

A number of embodiments of the invention have been described. Nevertheless, it will be understood that various modifications may be made without departing from the spirit and scope of the invention. Accordingly, other embodiments are within the scope of the following claims.

What is claimed is:

1. A method for the removal of a cadmium (Cd) impurity or contaminant from a Cd-comprising phosphoric acid solution, or a Cd-comprising phos-acid feedstock, comprising:
   (a) treating a Cd-comprising phosphoric acid solution or a phos-acid feedstock with an activated clay, a bentonite material and/or flocculents thereof, to produce a pretreated acid mix;
   (b) clarifying or settling the pretreated acid mix to substantially remove solids that are in the pretreated acid mix to produce a clarified phos-acid acid mix;
   (c) treating or filtering the clarified phos-acid acid mix to substantially remove an insoluble solid or solids, if present, after the clarifying or settling step of (b), thereby generating a filtered solid or filtered solids, if present;
   (d) feeding or loading a clarified phos-acid solution obtained from the treating or filtering in step (c) onto a strong cation exchange resin or a composition capable of reversibly binding the Cd under conditions wherein the Cd and non-Cd cations remain bound on or reversibly bind to the strong cationic exchange resin or the composition capable of reversibly binding the Cd, and non-Cd cations also remain on or reversibly bind to the strong cationic exchange resin or the composition capable of reversibly binding the Cd; and
   (e) washing the strong cation exchange resin or the composition capable of reversibly binding the Cd with a solution or solvent that does not remove substantially all of the Cd or other cations reversibly bound to the strong cation exchange resin or the composition capable of reversibly binding the Cd to remove phos-acid from the strong cation exchange resin prior to eluting the Cd or other ions.

2. The method of claim 1, further comprising a step (f) comprising eluting Cd and non-Cd cations reversibly bound to the strong cation exchange resin or the composition capable of reversibly binding the Cd using a regeneration solution comprising a regeneration acid as an eluant, resulting in or thereby producing a Cd-comprising solution or eluate or spent regeneration solution comprising all or substantially all of the Cd from the strong cation exchange resin or the composition capable of reversibly binding the Cd along with all or substantially all of the non-Cd cations that were reversibly bound onto the resin, thereby regenerating the resin.

3. The method of claim 2, wherein the regeneration acid is in a diluted form and comprises a sulfuric acid ($H_2SO_4$), a nitric acid (HNO3) or a hydrochloric acid (HCl).

4. The method of claim 3, wherein the sulfuric acid, nitric acid or hydrochloric acid strength is from between about 5% up to 99%, or the acid strength is about 35%, 40%, 50%, 60%, 70%, 80%, 90% or 98%, or the acid strength can be in a range of about 62% for nitric acid and about 37% for hydrochloric acid.

5. The method of claim 2, wherein the regeneration acid comprises:
   (a) a sulfuric, nitric or hydrochloric acid at a strength from about 5% to up to about 98%, or at a strength in a range of between about 20% to about 40%; or
   (b) between about 5% to about 98%, or between about 20% to about 40%, of the volume of the regeneration solution.

6. The method of claim 2, wherein in step (f) between about 70% and 99.9%, or about 80%, 85%, 90%, 95%, 96%, 97%, 98% or 99% or 99.5% or more, of the Cd is eluted from the strong cation exchange resin or the composition capable of reversibly binding the Cd.

7. The method of claim 2, wherein the strong cation exchange resin is in a primary continuous ion exchange (CIX) system, and the method further comprises moving all or part of the Cd-comprising solution or eluate or spent regeneration solution from the primary CIX system to:
   a secondary CIX system, wherein the Cd-comprising solution or eluate or spent regeneration solution of the primary CIX system is fed or loaded onto a strong cation exchange resin in the secondary CIX system under conditions wherein Cd remains on or reversibly binds to the strong cationic exchange resin, and all or substantially all of the non-Cd cations do not bind to, or pass through, the resin.

8. The method of claim 7, wherein:
   (a) between about 80% and 99.9%, or between about 90% and 99%, or about 90%, 95%, 96%, 97%, 98% or 99% or more, of the Cd is eluted from the strong cation exchange resin in the secondary CIX system to form a Cd-enriched solution;
   (b) an eluate of the Cd-enriched spent regeneration solution from the secondary CIX system is:
      (1) disposed of, optionally disposed of by sending to a separate pond system for disposal; or
      (2) sent to a cadmium recovery system to recover the Cd as a purified Cd compound or a Cd product,
   (c) a purified Cd obtained from the cadmium recovery system is between about 80% and 99.9%, or between about 90% and 99%, or about 90%, 95%, 96%, 97%, 98% or 99% or more Cd pure; or
   (d) an eluate material from the secondary CIX system substantially not comprising Cd is disposed of in a gypsum pond, or separate pond system.

9. The method of claim 6, wherein between about 80% and 99.9%, or between about 90% and 99%, of the Cd in the spent regeneration solution remains on or reversibly binds to the strong cationic exchange resin, and after loading the spent regeneration solution of the primary CIX system onto the strong cation exchange resin, eluting the Cd and other bound ions with a fresh regeneration solution comprising a dilute form of a strong acid.

10. The method of claim 2, wherein:
   (a) the regeneration acid comprises a solution wherein between about 5% to 90%, or about 20%, 25%, 30%, 35%, 40% or 44% of the regeneration solution by volume is the regeneration acid; or
   (b) the regeneration acid comprises a solution wherein between about 10% to 80% or 15% to 70%, of the regeneration solution by volume is the regeneration acid; or, the regeneration acid comprises a solution wherein about 25%, 30%, 35%, 40% or 44%, of the regeneration solution by volume is the regeneration acid.

11. The method of claim 1, further comprising moving all or part of the Cd-comprising solution or eluate or spent regeneration solution to a pond system for disposal.

12. The method of claim 1, wherein the strong cationic exchange resins or the composition capable of reversibly binding the Cd comprises a material comprised of gel polystyrene crosslinked with divinylbenzene (DVB) and a sulfonic acid functional group.

13. The method of claim 1, wherein the strong cationic exchange resins or the composition capable of reversibly binding the Cd comprises a resin consisting of gel polystyrene crosslinked with divinylbenzene (DVB) and a sulfonic acid functional group.

14. The method of claim 1, wherein the composition capable of reversibly binding the Cd comprises or is fabricated as beads, wires, meshes, nanobeads, nanotubes, nanowires or other nano-structures, or a hydrogel.

15. The method of claim 1, wherein the strong cation exchange resin or the composition capable of reversibly binding the Cd is in a protonated, or H+, form.

16. The method of claim 1, wherein in step (b) the clarifying or settling of the pretreated acid mix is in a clarifier, and removes substantially insoluble solids.

17. The method of claim 16, wherein:
(a) a clarifier recycler, or an underflow pump, is used to move or remove the clarifier's underflow; or
(b) the clarifier recycler or the underflow pump moves or returns the clarifier's underflow to a phos-acid plant.

18. The method of claim 1, wherein between about 50% and 99.9%, or between about 70% and 99%, of the insoluble solids are removed.

19. The method of claim 1, wherein the treating or filtering the clarified phos-acid acid mix is conducted in a polishing filtration system, wherein the polishing filtration system comprises a pressure leaf filter.

20. The method of claim 1, wherein after treating or filtering the clarified phos-acid acid mix, between about 95% and 99.9% of the insoluble solids are removed from the clarified phos-acid mix.

21. The method of claim 20, wherein after the treating or polishing filtration step between about 98% and 99% of the insoluble solids are removed from the clarified phos-acid mix.

22. The method of claim 1, wherein the filtered solid or filtered solids are returned to a phos-acid plant.

23. The method of claim 1, wherein:
(a) between about 70% and 99.9%, or between about 80% and 99.5% of the Cd remains on or reversibly binds to the strong cation exchange resin along with non-Cd cations;
(b) between about 70% and 99.9% of the Cd remains on or reversibly binds to the strong cation exchange resin along with non-Cd cations;
(c) between about 90% and 99%, of the Cd remains on or reversibly binds to the strong cation exchange resin along with non-Cd cations; or
(d) the amount of phos-acid that is fed to the strong cation exchange resin is in excess of what would normally be processed with an ion exchange system once the strong cationic exchange resin is fully loaded so as to cause additional Cd cations to displace or crowd off non-Cd cations bound to the resin, wherein the excess phos-acid is fed to a resin saturated with both Cd and non-Cd cations.

24. The method of claim 1, wherein the strong cation exchange resin is washed with a solution or solvent comprising water.

* * * * *